April 21, 1953 E. C. SCHROEDER ET AL 2,635,751
SIEVE HOLD-DOWN MECHANISM FOR SIFTERS AND SIMILAR MACHINES
Filed Sept. 9, 1950
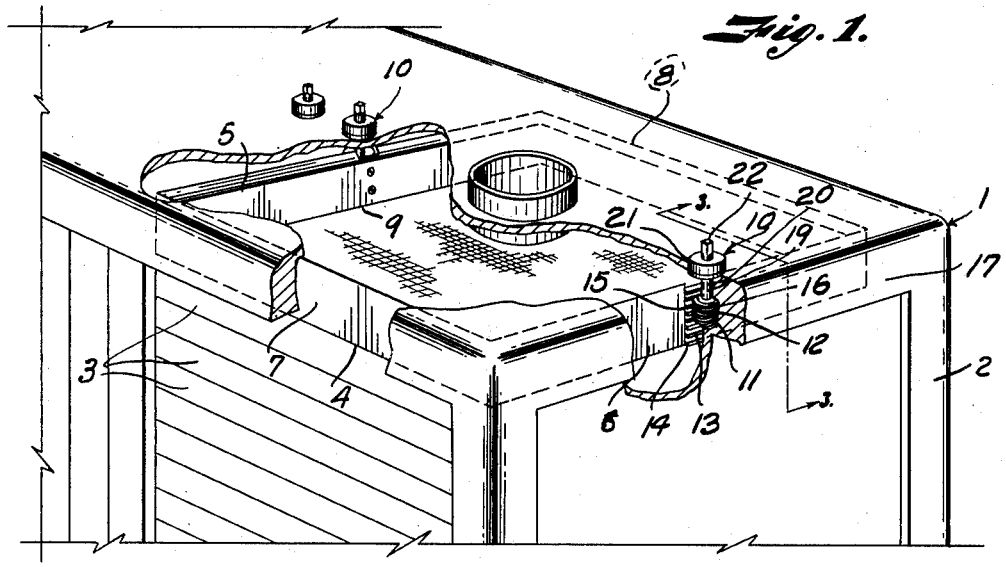
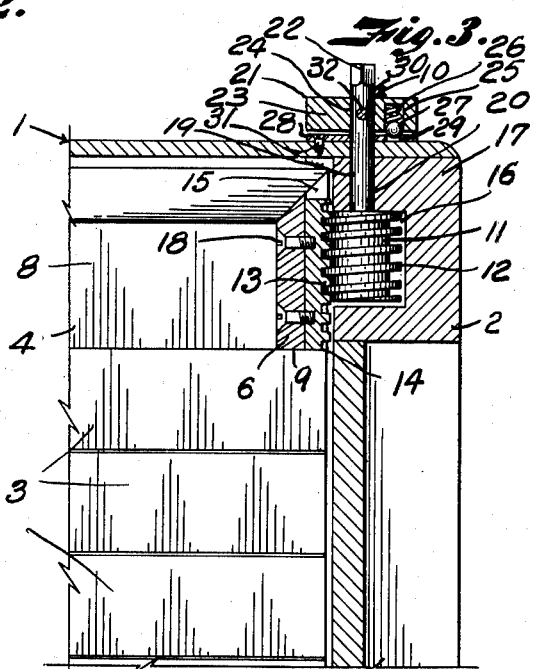
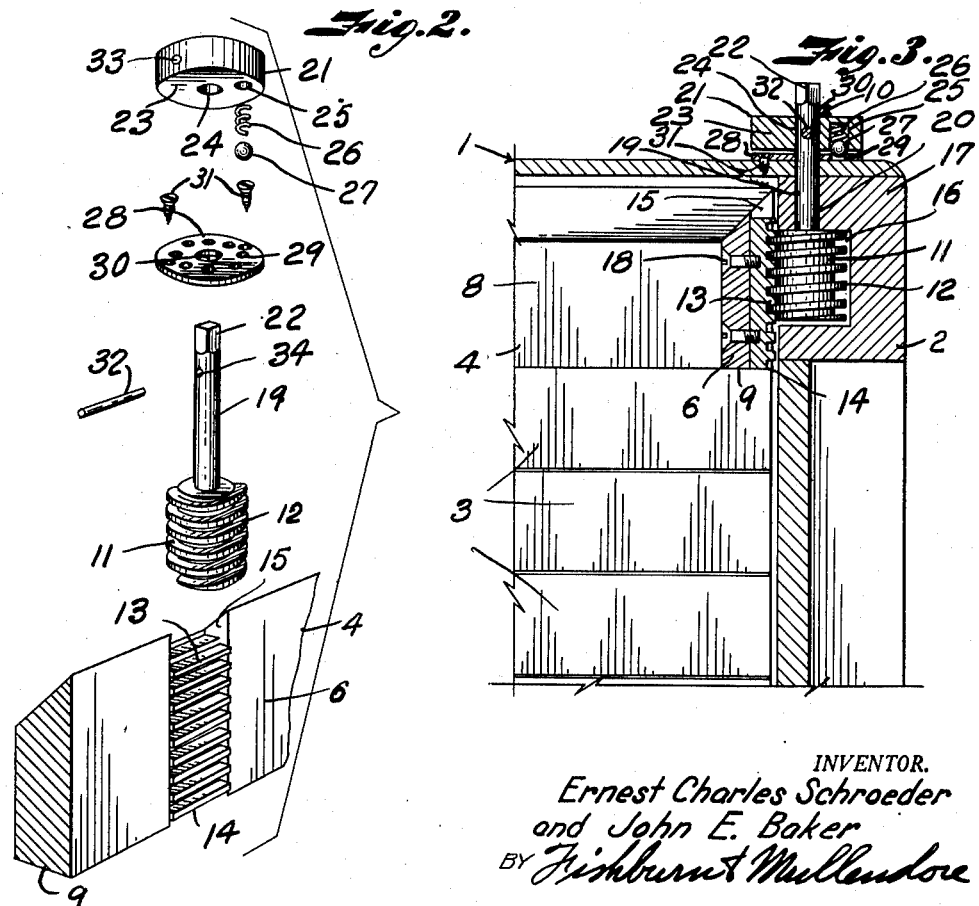
INVENTOR.
Ernest Charles Schroeder
and John E. Baker
BY Fishburn & Mullendore
ATTORNEYS Patented Apr. 21, 1953

2,635,751

UNITED STATES PATENT OFFICE 2,635,751

SIEVE HOLD-DOWN MECHANISM FOR SIFTERS AND SIMILAR MACHINES

Ernest Charles Schroeder and John E. Baker, Leavenworth, Kans.

Application September 9, 1950, Serial No. 183,986

3 Claims. (Cl. 209—319)

This invention relates to sifters and particularly to a hold down mechanism for retaining the sieving mechanism thereof. For example, sifters used in the processing of flour comprise a housing enclosing a plurality of super-imposed sieves through which flour particles are sifted to size and quality, and it is the principal purpose of the present invention to provide a simple and efficient pressing or hold down mechanism for effectively retaining the sieves in position so that they cannot leak or shift within the housing when the sifter is in motion.

In accomplishing these and other objects of the invention hereinafter pointed out, we have provided an improved structure the preferred form of which is illustrated in the accompanying drawing wherein:

Fig. 1 is a fragmentary view of a sifter equipped with a sieve hold down mechanism embodying the features of the present invention.

Fig. 2 is a perspective view of parts of the hold down mechanism shown in disassembled spaced relation to better illustrate the construction, the sieve pressure frame being shown in fragmentary section.

Fig. 3 is an enlarged section on the line 3—3 of Fig. 1.

Referring more in detail to the drawing:

1 designates a sifter such as used in the mill processing of a flour and which includes a casing 2 containing a plurality of super-imposed or stacked sieves 3 through which flour particles are sifted incidental to motion of the machine. It is essential that the sieves be pressed tightly together and held in place so that they cannot leak or shift out of position. This is accomplished in accordance with the present invention by means of a pressure frame 4 which conforms with the marginal shape of the sieves and in the present instance, comprises a rectangular frame having side rails 5—6 and 7—8 suitably connected at the corners and having lower edges 9 bearing upon the upper marginal edge of the uppermost sieve as shown in Figs. 1 and 2. The pressure frame is mounted for free up and down movement within the housing so as to follow the sieves when pressure is applied thereto by pressure supplying mechanisms 10 which constitute the important feature of the present invention as now to be described.

In order to properly apply the retaining pressure, a plurality of mechanisms 10 may be used as shown in Fig. 1 to apply pressure to the frame 4. In the present illustration, two mechanisms are provided for applying pressure to the mid portions of opposite rails 5 and 6 of the pressure frame as shown in Fig. 1. Each mechanism includes a worm 11 having helical threads 12 meshing with teeth 13 on a rack 14. In the illustrated instance, the rack 14 is mounted within a recess 15 extending transversely of the frame rails on the outer side thereof as shown in Fig. 3 so that the teeth 13 project to properly mesh with the threads 12 of the worm 11, the worm 11 being suitably mounted, for example, within a recess 16 provided in the frame 17 of the casing and which is retained therein from axial movement so as to effect an up-and-down movement of the pressure when the worm is rotated. The rack 14 may be secured in position by screws or other suitable means 18. The worm 11 has a shaft 19 rigidly connected therewith and which projects through a suitable opening 20 in the frame 17 to carry a ratchet collar 21 and provide a wrench engaging head 22 by which the shaft may be rotated to effect pressure adjustment of the sieve pressing frame. The collar 21 is to prevent drift or loosening of the worm shaft after the desired pressure has been obtained on the sieve pressing frame and includes a disk-like member 23 having an axial bore 24 to accommodate the shaft and having a radially spaced downwardly opening recess 25 for accommodating a coil spring 26 engaging a ratchet or click which may be in the form of a ball 27. Cooperating with the ratchet collar and ball is a ratchet plate 28 having a circular series of spaced recesses or apertures 29 that are adapted to be engaged by the ball to prevent drift or loosening of the worm through turning incidental to motion of the machine. The ratchet plate has an axial opening 30 for passing the shaft and is secured in fixed relation with the housing of the machine by suitable fastening devices such as screws 31. The ratchet collar is rigidly fixed to the shaft preferably by means of a taper pin 32 that is driven into registering openings in the collar and shaft 33 and 34 respectively as shown in Fig. 2.

Assuming that the pressure frame 4 and pressure applying mechanisms 10 are assembled and installed in the sifter as illustrated and described, hold down pressure is applied to the sieves 3 by turning the worms 11. This is effected by applying a suitable wrench (not shown) to the heads 22 of the shafts 19 and rotating them in proper direction to cause the worm threads 12 to move the racks 14 and carry the pressure frame downwardly into desired pressing relation with the sieves 3. When the turning pressure is applied through the wrench, the ball 27 will ride into and out of the recesses 39 as the ratchet collar turns under yielding pressure of the spring 26, however, the pressure of the spring 26 is sufficient to prevent drift or loosening of the worms during motion of the machine when the sifter is in operation.

From the foregoing, it is obvious that we have provided a simple and inexpensive pressure or hold down mechanism that is easily constructed and which effectively retains a desired hold down pressure on the sieves of a sifter or similar machine.

What we claim and desire to secure by Letters Patent is:

1. A mechanism for applying a holding pressure to the sieves of a sifting mechanism including a frame, racks on opposite sides of the frame, worms meshing with teeth of the racks, shafts rigidly connected with the worms for turning the worms to reciprocate the racks, collars on the shafts, spring pressed means carried by the collars, and ratchet plates having portions adapted to be engaged by the spring pressed means to resist turning of the collars relatively to the ratchet plates and prevent movement of the worms relatively to the racks after pressure is applied to the sieves through said racks.

2. In a sifter including a housing containing a plurality of sieves one stacked on the other, a pressure frame adapted to bear against an outermost sieve of the stack, rack members carried at spaced points on the pressure frame, worms having threads engaged with teeth of the racks, means mounting the worms for restricted axial movement in said casing whereby the worms are adapted to move the pressure frame to and from pressing relation with the sieves, shafts fixed to the worms and projecting from the casing, a collar for each shaft, spring pressed means carried by the collars, and plates fixed to the frame coaxially of the shafts and having recessed portions adapted to be engaged by the spring pressed means to frictionally retain the worms from free rotation.

3. In a sifter including a casing containing a plurality of sieves one stacked directly upon another, a pressure frame adapted to bear against the upper sieve, rack members fixed to spaced apart portions of the pressure frame, said casing having recesses registering with teeth of said racks, worms having fixed axial support in said recesses, and shafts fixed to the worms and projecting exteriorly of the casing and adapted to be rotated in one direction for pressing the pressure frame against the sieves and in the opposite direction to raise the pressure frame from contact with the sieves.

ERNEST CHARLES SCHROEDER.
JOHN E. BAKER.

References Cited in the file of this patent

UNITED STATES PATENTS

| Number | Name | Date |
|---|---|---|
| 385,427 | Pugh | July 3, 1888 |
| 1,450,166 | Bell | Apr. 3, 1923 |
| 1,711,548 | Soldan | May 7, 1929 |
| 1,716,416 | Campbell | June 11, 1929 |
| 1,913,749 | Folk | June 13, 1933 |
| 1,920,972 | Deister | Aug. 8, 1933 |
| 2,114,406 | Simpson | Apr. 19, 1938 |
| 2,358,453 | Gilson | Sept. 19, 1944 |
| 2,511,239 | Behnke et al. | June 13, 1950 |

FOREIGN PATENTS

| Number | Country | Date |
|---|---|---|
| 167,047 | Great Britain | Aug. 4, 1921 |
| 373,167 | Germany | Apr. 9, 1923 |